May 14, 1968     O. E. ROSAEN     3,382,978
SELF-CLEANING FILTER DEVICE

Filed May 17, 1965     2 Sheets-Sheet 1

INVENTOR.
OSCAR E. ROSAEN

BY Hauke & Hauke

ATTORNEYS

May 14, 1968  O. E. ROSAEN  3,382,978
SELF-CLEANING FILTER DEVICE
Filed May 17, 1965  2 Sheets-Sheet 2
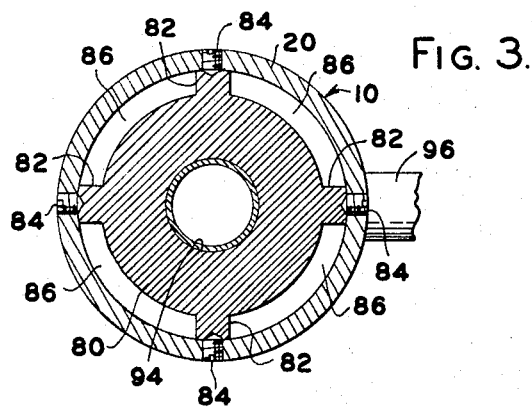
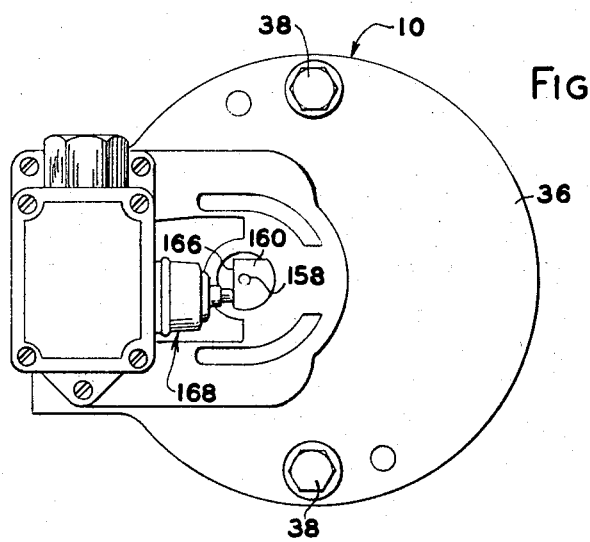
INVENTOR.
OSCAR E. ROSAEN
BY Hauke & Hauke
ATTORNEYS 3,382,978
SELF-CLEANING FILTER DEVICE
Oscar E. Rosaen, Grosse Pointe Shores, Mich., assignor to Rosaen Filter Company, Hazel Park, Mich., a corporation of Michigan
Filed May 17, 1965, Ser. No. 456,400
4 Claims. (Cl. 210—90)

ABSTRACT OF THE DISCLOSURE

A filter device for a fluid reservoir having an in place self-cleaning arrangement for reversing the flow of fluid through the filter element with a valved conduit communicating between the filter housing and the exterior of the reservoir for the carrying out of the fluid system the particles dislodged from the filter element. Further the reverse flow system incorporates a piston located on the outlet side of the filter element for increasing the force with which the system fluid is directed through the filter element in a reverse direction.

---

The present invention relates to fluid filtering devices and more particularly to such a device having a new means for cleaning the filter element in place.

Filter elements for fluid filtering systems periodically become clogged and unless some means is provided for cleaning the element in place it is necessary to remove the element for cleaning or replacement at regular intervals. Since this is a time consuming task and usually requires that fluid system be completely shut down while the element is being removed and replaced efforts have been directed toward providing filter devices in which the filter elements can be cleaned in place.

Such filter devices have been heretofore provided in which the cleaning is performed by forcing fluid through the element in a direction reverse to normal fluid flow through the element. While such devices are generally satisfactory they often suffer from several important disadvantages. Often no means are provided for insuring that the particles dislodged by the reverse flow are carried out of the fluid system. In many of such devices the particles are just dumped on the inlet side of the filter element where they soon again produce clogging. Other devices of this type utilize too much fluid for the reverse flow which results in a substantial loss of system pressures and system fluid. In others the force of the reverse flow fluid is not substantial enough to produce an effective cleaning action.

The present invention provides a fluid filtering device in which means are provided for indicating the condition of the filter element exteriorly of the device. When the filter element has become clogged to the extent that cleaning is desired a reverse flow of fluid through the element can be actuated. Means are provided for insuring that the particles dislodged from the filter element by the reverse flow of fluid will be carried out of the fluid system. Further the reverse flow producing means utilizes auxiliary means for increasing the force with which the system fluid is directed through the filter element in a reverse direction.

It is an object then of the present invention to improve fluid filtering systems by providing a filter device for such systems having an improved means for cleaning the filter element in place.

It is another object of the present invention to improve self-cleaning filter devices by providing means insuring that the foreign particles dislodged from the filter element during the cleaning operation will be removed from the fluid system.

It is still another object of the present invention to improve self-cleaning filter devices by providing means for increasing the force with which the fluid is directed through the filter element in a reverse direction during the cleaning operation.

Figure 1:
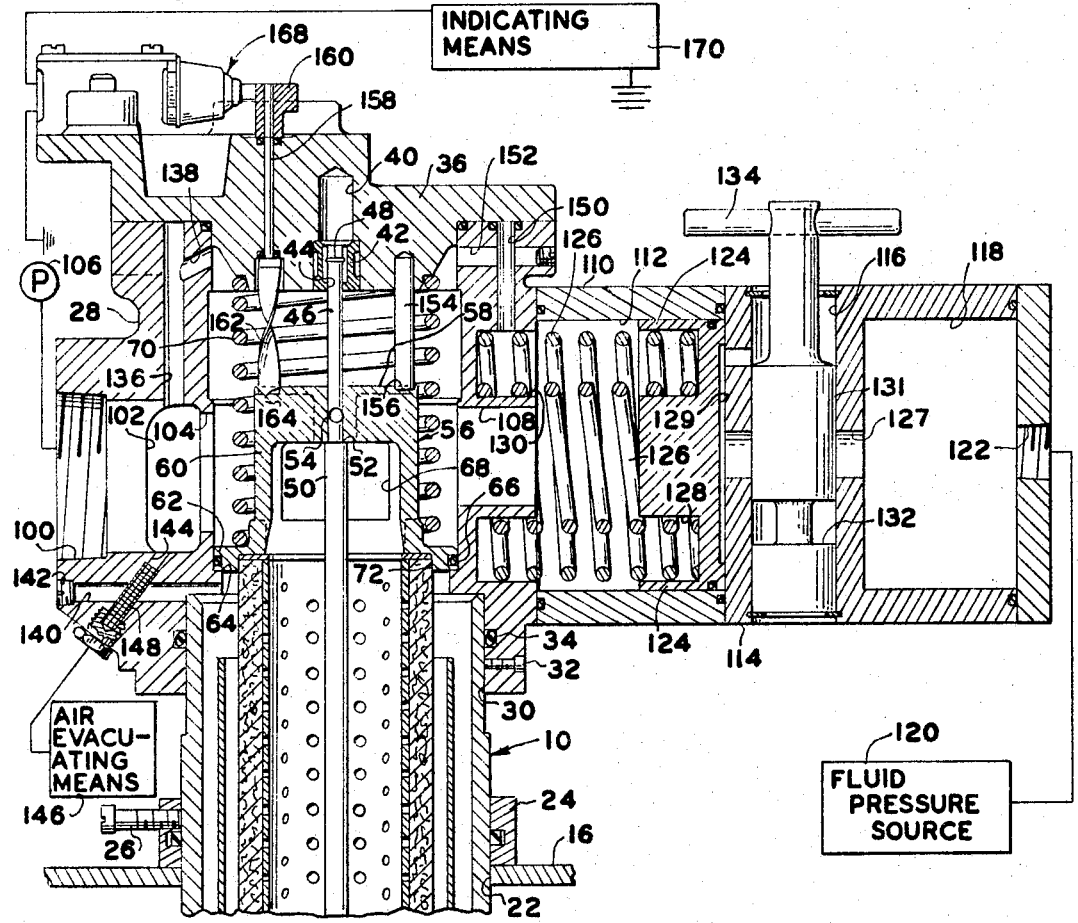
Figure 1:
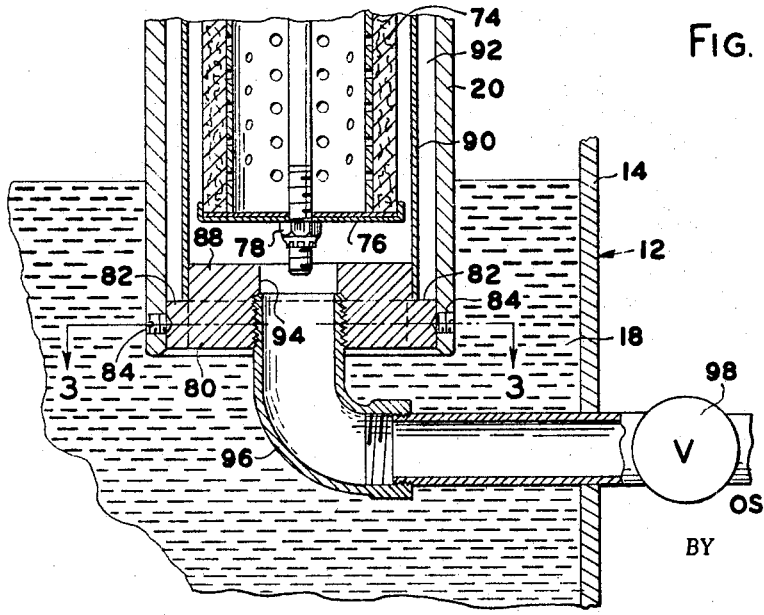
Figure 1:

Still further objects and advantages of the present invention will readily occur to one skilled in the art to which the invention pertains upon reference to the following drawings in which like reference characters refer to like parts throughout the several views and in which, FIG. 1 is a longitudinal cross-sectional view of a preferred filter device of the present invention with portions of a preferred fluid system connected with the filter device illustrated diagrammatically, FIG. 2 is a top elevational view of the device illustrated in FIG. 1, and FIG. 3 is a cross-sectional view taken substantially on line 3—3 of FIG. 1.

Now referring to the drawings for a more detailed description of the present invention a preferred filter device is generally indicated at 10 and as shown in FIG. 1 is adapted to be mounted to extend partially into a fluid reservoir 12. The fluid reservoir 12 comprises side walls 14 and a top plate 16 and is at least partially filled with a suitable fluid 18.

The filter device 10 preferably comprises an outer tubular member 20 adapted to extend through an opening 22 provided in the top plate 16 with the lower end disposed below the level of fluid 18 in the reservoir 12 and the upper end disposed above the top plate 16. The tubular member 20 is adapted to be carried in this position by an annular mounting bracket 24 carried by the top plate 16 and maintaining the tubular member 20 in position by means of a plurality of annularly spaced screws 26.

A hollow housing member 28 is provided with a recessed portion 30 adapted to receive the upper end of the tubular member 20. The housing member 28 is secured to the tubular member 20 by annularly spaced screws 32. An O-ring seal 34 is carried in the recessed portion 30 to prevent fluid leakage along the exterior surface of the tubular member 20.

The upper end of the housing member 28 is closed by an end cap 36 secured to the housing member 28 by screws 38 as shown in FIG. 2. The end cap 36 is provided with a central bore 40 opening axially to the interior of the housing member 28. The bore 40 is enlarged at its lower end to carry an inverted cup member 42. The cup member 42 is provided with a central opening 44 which axially slidably receives a rod 46. Downward movement of the rod 46 is limited by a snap ring 48 carried near the end of the rod 46 and the rod 46 is free to move axially upwardly into the bore 40. The rod 46 extends axially downwardly through the interior of the housing member 28 and the tubular member 20 and is provided with an enlarged diameter portion 50 which forms a shoulder 52 disposed within the housing member 28.

The shoulder 52 and a pin 54 provide the means for securing a porting member 56 to the rod 46 for axial movement therewith. The porting member 56 is preferably in the form of an inverted cup having an upper circular portion 58 received by the rod 46 and a cylindrical downwardly extending portion 60. A radially outwardly extending flange 62 is formed at the lower edge of the portion 60 and is adapted to axially slidably engage the inner wall of the housing member 28. A shoulder 64 formed in the housing member 28 limits downward movement of the porting member 56. The flange 62 carries a piston ring 66 and the cylindrical portion 60 is provided with a plurality of axially extending annularly spaced slots 68. A spring 70 biased between the end cap 36 and the flange 62 urges the porting member 56 downwardly against the shoulder 64.

An annular recess 72 is formed in the lower surface of the porting member 56 and a substantially cylindrical filter element 74 has its upper edge disposed within the recess 72. A circular plate 76 closes the lower end of the filter element 74. The rod 46 extends through the plate 76 and a nut 78 carried by the free end of the rod 46 mounts the filter element 74 in position against the porting member 56 and within the tubular member 20.

The inlet or lower end of the tubular member 20 is preferably substantially closed by a circular member 80. The member 80, as can best be seen in FIG. 3 is provided with a plurality of annularly spaced radially extending peripheral projections 82 which receive annularly spaced screws 84, to secure the member 80 to the tubular member 20. The projections 82 define a plurality of arcuate slots 86 providing communication between the reservoir 12 and the interior of tubular member 20. The member 80 is provided with an upper annular axially extending boss portion 88 which provides the means for carrying an inner tubular member 90 within the tubular member 20 and in a position spaced intermediate the filter element 74 and the tubular member 20. The tubular member 90 terminates short of the upper end of the tubular member 20 and the tubular members 20 and 90 define an annular passage 92. The member 80 and the boss portion 88 are provided with a central passage 94 and a conduit 96 is connected to the passage 94. The conduit 96 preferably extends through one of the side walls 14 and a valve 98 is carried in the conduit 96 exteriorly of the fluid reservoir 12.

The housing member 28 is provided with an outlet 100 opening radially to an arcuate chamber 102. Ports 104 provide communication between the interior of the housing member 28 and the chamber 102. A pump 106 is preferably connected to the outlet 100.

A port 108 is provided in the housing member 28 opposite the outlet 100 and is open to the interior of the housing member 28 as illustrated. A piston housing 110 is mounted to the housing 28 and defines a chamber 112 registering with the port 108. A valve housing 114 is mounted to the piston housing 110 and defines a vertical valve chamber 116 and an inlet chamber 118. The inlet chamber 118 is connected to a source of fluid pressure 120 preferably air through a port 122.

The piston housing 110 carries a piston 124 axially aligned with the port 108. Springs 126 carried in recesses 128 and 130 formed in the piston 124 and the housing member 28 respectively urge the piston 124 away from the housing member 28 and the port 108.

The valve housing 114 is provided with a passage 127 intersecting the valve chamber 116 and open to the chamber 112 and the inlet chamber 118. The piston 124 is provided with a recess 129 registering with the passage 126. A cylindrical valve member 131 is axially slidably carried in the vertical valve chamber 116 and is provided with an annular recess 132 disposed intermediate its ends so that ordinarily the valve member 131 is operable to block fluid flow through the passage 127 but when the valve 131 is moved axially to a position in which the recess 132 registers with the passage 127 fluid passes from the inlet chamber 118 to the chamber 112. A handle portion 134 is provided for the valve member 131 exteriorly of the valve housing 114.

A vertical passage 136 is provided in the housing member 28 and registers at one end with the arcuate chamber 102. The opposite end registers with a radial passage 138 opening to the interior of the housing member 28 adjacent the end cap 36. A radial passage 140 registers with the interior adjacent the juncture of the tubular member 20 and the housing member 28 and is closed by a plug 142. A passage 144 intersects the passage 140 and connects with the chamber 102. The passage 144 is connected with an air evacuating means 146 and carries a filter member 148. A passage 150 connects the upper portion of the piston chamber 112 with a radial passage 152 which connects the passage 150 with the upper portion of the interior of the housing member 28.

The porting member 56 and the filter element 74 are axially slidably mounted within the interior of the housing member 28 and the tubular member 20 as heretofore explained and a pin 154 is provided to guide the axial movement. The pin 154 has one end secured to the end cap 36 and the opposite free end extends through a slot 156 provided in the portion 58 of the porting member 56.

A shaft 158 is rotatably mounted in the end cap 36 and carries an actuator member 160 exteriorly of the end cap 36 and an actuator strip 162 interiorly of the housing member 28. The strip 162 is elongated and is twisted about its longitudinal axis as shown and extends axially into a slot 164 provided in the portion 58 of the porting member 56 so that as the porting member 56 moves axially within the housing member 28 the strip 162 engages in the slot 164 to produce rotation of the shaft 158 and the actuator member 160.

The actuator member 160 as can best be seen in FIG. 2 is provided with a cam surface 166 and a switch means 168 is carried by the end cap 36 in a position to be actuated by the cam surface 166 upon rotation of the actuator member 160. The switch means 168 actuates an indicating means 170 as shown diagrammatically in FIG. 1.

The operation of the fluid system is as follows: Fluid is ordinarily drawn by the pump 106 from the reservoir 12 through the slots 86 formed by the lower end of the tubular member 20 and the member 80, axially upwardly through the annular passage 92, over the top of the inner tubular member 90 and radially inwardly through the filter element 74. The filtered fluid is then drawn axially upwardly and radially outwardly through the porting member 56 and through the outlet 100.

As the filter element 74 begins to become clogged a pressure differential is produced across the flange 62 of the porting member 56 since the lower portion of the flange 62 is subjected to the pressure existing on the inlet side of the filter element 74 and the upper portion of the flange 62 is subjected to the pressure existing on the outlet side of the filter element 74. This pressure differential when it is sufficient to overcome the force of the spring 70 will cause the porting member 56 and the filter element 74 to be moved axially upwardly toward the cap member 36.

When the filter element 74 has reached a predetermined clogged condition the porting member 56 will have moved axially sufficiently to cause the actuator member 160 to actuate the switching means 168 and to indicate through the indicating means 170 that the filter element 74 is ready for cleaning.

To clean the filter element 74 the valve 98 is opened to open a path from the interior of the inner tubular member 90 to the outside of the fluid reservoir 12 through the conduit 96. With the valve 98 opened the valve member 131 is moved vertically upwardly in the chamber 116 by the handle portion 134 to bring the recess 132 in registry with the passage 127. When the passage 127 is opened a sudden surge of fluid preferably air is opened from the inner chamber 118 to the chamber 112 to move the piston 124 suddenly and with great force toward the port 108. The sudden and forceful movement of the piston 124 acting upon the fluid in the chamber 112 produces a shock wave which forces fluid radially inwardly through the porting member 56 and radially outwardly through the filter element 74. This reverse flow of fluid through the filter element 74 dislodges the particles tending to clog the filter element 74 and carries the particles through the conduit 96 where they can be collected exteriorly of the fluid reservoir 12.

The inner tubular member 90 insures that substantially all of the dislodged foreign particles will be removed from the system and prevents the foreign particles from flowing back into the fluid reservoir 12 where they would soon again clog the filter element 74.

The particular means for producing the reverse flow permits the use of inexpensive sources of fluid pressure such as air with little danger of the air becoming mixed with the system fluid. Further this permits a force to be produced sufficient to dislodge the particles without the pressures that the system is capable of producing acting as a limitation on the amount of force which can be produced. Since an auxiliary source is used to provide the force to produce the cleaning action there is little loss of system pressures and system fluid during the cleaning operation.

In the event that the cleaning means is not actuated to clean the filter element 74 after it has reached the point when it should become cleaned the pressure differential across the flange 62 will cause the porting member 56 and the filter element 74 to continue to move axially upwardly until a fluid path is opened directly from the inlet side of the filter element 74 past the flange 62 and through the port 104 to the outlet 100.

The passages 136 and 138, 140 and 144, and 150 and 152 provide the means for removing air which might become entrapped within the filter device 10. During normal operation of the fluid system the pump 106 will draw air trapped in the upper portion of the housing member 28 and the upper portion of the chamber 112 through the passages 150 and 152 and 138 and 136 to the chamber 102 where it will be removed from the filter device 10 with the system fluid. Similarly air which might become entrapped in the upper portion of the tubular member 20 on the inlet side of the filter element 74 is drawn by the pump 106 through the passages 140 and 144 to the chamber 102. Fluid which might escape through passage 144 with the entrapped air is filtered by the filter member 148.

Removal of air entrapped within the filter device 10 after the end cap 36 has been removed for any reason is accomplished by actuating the air evacuating means 146 for a short time prior to restoring operation of the fluid system. This draws entrapped air through the passages 136 and 144 to remove any air which might have been trapped within the device.

It is apparent that although I have described but a single embodiment of my invention many changes and modifications can be made therein without departing from the spirit of the invention as expressed by the appended claims.

I claim:

1. In a fluid system including a fluid reservoir a filter device comprising,
    (a) a tubular housing member mounted to extend into said reservoir with an inlet end disposed within said reservoir and an opposite end disposed exteriorly of said reservoir,
    (b) means carried by said housing member and defining an outlet,
    (c) a filter element carried in said housing member intermediate said inlet end and said outlet,
    (d) means normally directing fluid from said inlet end through said filter element and to said outlet in one direction,
    (e) means producing fluid flow through said filter element in an opposite direction,
    (f) said last mentioned means comprising a piston disposed on the outlet side of said filter element, means urging said piston toward a position away from said outlet side of said piston, and means selectively actuable to move said piston toward said outlet side of said filter element,
    (g) an inner tubular member disposed within said tubular housing member intermediate the inlet side of said filter element and said tubular housing member,
    (h) means directing fluid from said reservoir intermediate said tubular housing member and said tubular member and through said filter element,
    (i) conduit means connecting the space intermediate said tubular member and the inlet side of said filter element to a point exteriorly of said reservoir, and
    (j) valve means carried in said conduit means to open and close fluid flow therethrough.

2. The system as defined in claim 1 and including means operable to indicate the clogged condition of said filter element exteriorly of said filter device.

3. The system as defined in claim 2 and including means operable to open a fluid path from said inlet end of said tubular housing member to said outlet and bypassing said filter element upon said filter element reaching a predetermined clogged condition.

4. The system as defined in claim 3 and in which said last mentioned means comprises,
    (a) normally closed valve means carried intermediate said inlet end of said tubular housing member and said outlet, and
    (b) pressure responsive means operable to open said valve means upon a predetermined pressure differential being produced across said filter element.

References Cited

UNITED STATES PATENTS

| | | | |
|---|---|---|---|
| 2,035,592 | 3/1936 | Christensen | 210—333 X |
| 2,338,418 | 1/1944 | Forrest et al. | 210—412 |
| 2,627,979 | 2/1953 | Lamb | 210—412 |
| 2,855,100 | 10/1958 | Findlay | 210—412 X |
| 3,273,715 | 9/1966 | Rosaen | 210—90 |
| 3,288,289 | 11/1966 | Rosaen | 210—90 |
| 3,288,290 | 11/1966 | Rosaen | 210—172 X |

SAMIH N. ZAHARNA, *Primary Examiner.*

RUEBEN FRIEDMAN, *Examiner.*